United States Patent
Oh et al.

(10) Patent No.: US 6,268,088 B1
(45) Date of Patent: Jul. 31, 2001

(54) GEL POLYMER ELECTROLYTE OF VINYL ACETATE

(75) Inventors: Boo-Keun Oh, Taijeon; Young-Roak Kim; Dong-Won Kim, both of Taejeon; Chang-Woo Baek, Taegu, all of (KR)

(73) Assignee: Cheil Industries, South Korea (KR)

( * ) Notice: Subject to any disclaimer, the term of this patent is extended or adjusted under 35 U.S.C. 154(b) by 0 days.

(21) Appl. No.: 09/483,842

(22) Filed: Jan. 17, 2000

Related U.S. Application Data

(63) Continuation-in-part of application No. 09/079,632, filed on May 15, 1998, now abandoned.

(30) Foreign Application Priority Data

May 15, 1997 (KR) .................................................. 97-18703
Sep. 12, 1997 (KR) .................................................. 97-48048

(51) Int. Cl.$^7$ .............................. H01M 4/36; H01M 4/40
(52) U.S. Cl. ........................... 429/303; 429/213; 429/217
(58) Field of Search .................................. 429/134, 190, 429/300, 223, 224, 303, 330, 188, 218.1, 212, 231.8, 213, 217

(56) References Cited

U.S. PATENT DOCUMENTS

| | | | |
|---|---|---|---|
| 5,219,679 | 6/1993 | Abraham et al. | 429/192 |
| 5,296,318 | 3/1994 | Gozdz et al. | 429/192 |
| 5,561,007 | * 10/1996 | Saidi . | |
| 5,698,338 | * 12/1997 | Saidi et al. . | |
| 5,707,760 | * 1/1998 | Stux et al. . | |
| 5,789,110 | * 8/1998 | Saidi et al. . | |
| 5,962,168 | * 10/1999 | Denton, III . | |
| 6,103,419 | * 8/2000 | Saidi et al. . | |

FOREIGN PATENT DOCUMENTS

| | | |
|---|---|---|
| 6-131423 | 5/1994 | (JP) . |
| 6-126150 | 6/1994 | (JP) . |
| 6-153127 | 6/1994 | (JP) . |

OTHER PUBLICATIONS

C. Schmutz, J.M. Tarascon, S.A. Gozdz, P.C. Warren and F.K. Shokoohi, Bellcore, Red Bank, NJ, 07701, "The Electrochemical Society Proceedings," vol. 94–28, pp. 330–335 (1994).

* cited by examiner

*Primary Examiner*—Gregory Delcotto
*Assistant Examiner*—Gregory E. Webb
(74) *Attorney, Agent, or Firm*—Woodcock Washburn Kurtz Mackiewicz & Norris LLP

(57) ABSTRACT

A gel polymer electrolyte according to the present invention comprises a polymer selected from the group consisting of vinyl acetate copolymer, poly(ethylene/vinylacetate/carbon oxide: EVACM), and poly(ethylene/vinylacetate/maleic acid anhydride: EVAMA); an inorganic filler; and a liquid electrolyte that a lithium salt is dissolved in an aprotic solvent. It is preferable that the polymer material in a gel polymer electrolyte according to the present invention is in the range of 20 to 30% by weight, the inorganic material filler is in the range of 5 to 20% by weight, and the liquid electrolyte is in the range of 60 to 80 % by weight. As a specific functional group which has a high compatibility with a liquid electrolyte in the present invention is contained in the polymer material, a lithium ion becomes to move with ease in electrolyte, and the ionic conductivity is over 0.5 mS/cm which is the demand level of a gel polymer electrolyte. Also, it provides the gel polymer electrolyte material with a high film formability, a good property of containing an electrolyte, a good adhesion, and a good mechanical strength.

22 Claims, 1 Drawing Sheet

GEL POLYMER ELECTROLYTE OF VINYL ACETATE

This application is a continuation-in-part of provisional U.S. Ser. No. 09/079,632 filed May 15, 1998 abandoned which in turn was filed from Korean Application No. 97-18703 filed May 15, 1997 and No. 97-48048 filed Sep. 12, 1997.

FIELD OF THE INVENTION

The present invention relates to a gel polymer electrolyte component derived of vinyl acetate in use of a lithium polymer secondary cell having the good ion conductivity, electrochemical stability, formability, and mechanical strength. More specifically, the present invention relates to a gel polymer electrolyte which keeps to be stable the liquid organic electrolyte in the polymer matrix and has a high ionic conductivity and electrochemical stability by improving compatibility with a liquid organic electrolyte, and also relates to a gel polymer electrolyte which has an improved formability and mechanical strength and can be easily prepared at room temperature by introducing the structure unit of ethylene to the polymer.

BACKGROUND OF THE INVENTION

According to rapid development of electrical, electronic, telecommunicational, and computer industry, the need for a secondary cell having a high performance and stability has been increased. Especially, electronic goods are becoming smaller and more portable so that a secondary cell which is a main part thereof also required to be thinner and smaller. Now, although a nickel-cadmium secondary cell and a nickel-hydrogen secondary cell are commonly used, a lithium secondary cell is spotlighted as a new-type secondary cell having higher energy density than those secondary cells.

According to applied electrolytes in a lithium secondary cell, there are a lithium ion cell in which electrolyte is liquid, and a lithium polymer cell in which electrolyte is solid or gel. In case of lithium ion cell there is the merit of high capacity, but it needs special device such as a protective circuit because a liquid electrolyte containing lithium salt should be used. While in case of lithium polymer cell, it is much more stable than lithium ion cell because it uses a polymer as an electrolyte.

In order to be technically available, a lithium polymer secondary cell should be electrochemically stable, that is, it should be stable in the broad range of voltage to resist for an overrecharged condition. And it should show a high ionic conductivity over 1 mS/cm at room temperature. Also, materials for a gel polymer electrolyte which are chemically and electrically compatible with electrolyte materials should be developed. Especially, it should have a high physical property, processability and a good adhesion property between cathode and anode.

It is focused on the development of a gel polymer electrolyte which is made to a polymer electrolyte by mixing with liquid electrolyte used in the system of lithium ion cell to keep the lithium ion conductivity over 0.5 mS/cm at room temperature as a composition of electrolyte. Thus, recently a lithium polymer secondary cell has been developed by Hitachi Maxell Co. and Battery Engineering Co. The electrolyte used in the cell is also gel polymer electrolyte containing liquid electrolyte (Nikkei Electronics, May 19, 1997). These polymer electrolytes are manufactured by addition of a liquid electrolyte to a polymer matrix, which is the most closed system to commercial use of a lithium polymer secondary cell. The typical examples of polymer used as a gel polymer electrolyte are polyacrylonitrile (U.S. Pat. No. 5,219,679), polyvinylidene fluoride (U.S. Pat. No. 5,296,318), etc. Also, a gel polymer electrolyte made by mixing organic electrolyte with copolymer containing chlorovinyl, vinylacetate, acrylonitrile, styrene or methylacrylate was applied to a lithium polymer cell (Japanese Patent Laid-open No. 06-131423). The polymer material copolymerized a high polar monomer such as vinyl chloride, methyl metacrylate, vinyl alcohol, acrylic acid, etc. with a low polar monomer such as styrene, butadiene, etc. was used as a gel polymer electrolyte (Japanese Patent Laid-open No. 06-153127). NBR (acrylonitrile butadiene rubber), ABS (terpolymer of acrylonitrile, butadiene and styrene), and AAS (acrylonitrile acyl styrene copolymer) using acrylonitrile as a basic material was used as an example of the gel polymer electrolyte (Japanese Patent Laid-open No. 06-153127). By analyzing the prior art on the basis of the gel polymer electrolyte material, the most preferable polymer material in use of the electrolyte is (1) a polymer which has a high mechanical strength in order to make an easy preparation of an electronic cell, (2) a gel polymer electrolyte which inhibits the exudation phenomenon of liquid electrolyte out of polymer, (3) a gel polymer having the ionic conductivity over 0.5 mS/cm, (4) a gel polymer electrolyte having a high adhesion between cathode and anode, and (5) a gel polymer electrolyte having a high film formability. However, there is no polymer which has all of the above characteristics among the prior invented polymers. For example, in case of a poly(chlorovinylidene/hexachloropropylene) of U.S. Pat. No. 5,296,318, although the polymer is spotlighted due to a good mechanical strength, film formability, and ionic conductivity, it has difficulty in applying to the method to prepare the cell by sandwiching the gel polymer electrolyte between cathode and anode as a material of the electrolyte, which is generally the well-known method for preparation of a lithium polymer cell. Therefore, in order to improve the polymer material of U.S. Pat. No. 5,296,318, the polymer material was applied to the method of plastic lithium ionic cell preparation (PLI method) in which polymer matrix, cathode film and anode film are laminated to minimize the resistance of interface (The Electrochemical Society Proceedings, Vol. 94-28, pp 330–335).

Accordingly, the present inventors have developed a gel polymer electrolyte whose polymer is selected from the group consisting of poly(vinyl acetate), poly(ethylene/vinyl acetate), poly(ethylene/vinyl acetate/carbon monoxide), and poly(ethylene/vinyl acetate/maleic acid anhydride). The polymer elcectrolytes show a high adhesion, a good ionic conductivity, a good film formability, etc.

OBJECTS OF THE INVENTION

An object of the present invention is to provide a gel polymer electrolyte having a high ionic conductivity.

Another object of the invention is to provide a gel polymer electrolyte to prepare with ease a cell due to a high mechanical strength.

A further object of the invention is to provide a gel polymer electrolyte which inhibits the exudation phenomenon of liquid electrolyte out of polymer.

A further object of the present invention is to provide a gel polymer electrolyte having a high adhesion between cathode and anode.

A further object of the present invention is to provide a gel polymer electrolyte having a good film formability.

Other objects and advantages of this invention will be apparent from the ensuing disclosure and appended claims.

SUMMARY OF THE INVENTION

A gel polymer electrolyte according to the present invention comprises a polymer selected from the group consisting of vinyl acetate copolymer, poly(ethylene/vinylacetate/carbon oxide: EVACM), and poly(ethylene/vinylacetate/maleic acid anhydride: EVAMA); an inorganic filler; and a liquid electrolyte that a lithium salt is dissolved in an aprotic solvent.

The vinyl acetate copolymer is represented as the following formula (I):

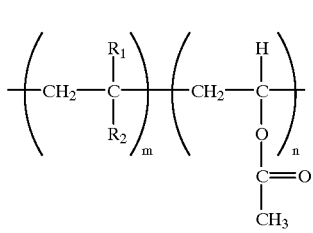

(I)

wherein $R_1$ is H or $CH_3$, $R_2$ is

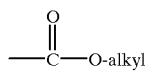

(alkyl is methyl, ethyl, propyl, isopropyl or butyl) or 1-pyrrolidone, m and n are mol % ratio with the range of 50–99:1–50.

The polymer selected from the group consisting of a copolymer (ethylene/vinyl acetate), poly(ethylene/vinyl acetate/carbon monoxide: EVACM), and poly(ethylene/vinyl acetate/maleic acid anhydride: EVAMA) is represented as the following formula (II):

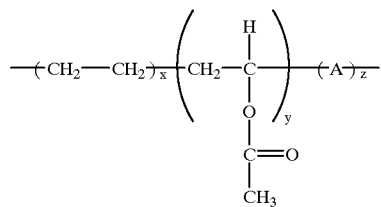

(II)

wherein A is carbonyl

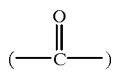

or maleic anhydride

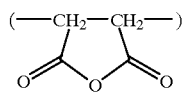

and x:y:z are weight % ration with the range of 60–90:10–40:0–20.

A liquid electrolyte used in preparation of the gel polymer electrolyte is composed of a lithium salt and an aprotic solvent. The lithium salt is selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), lithium trifluoromethanesulfonamide ($LiN(CF_3SO_2)_2$), and a mixture thereof.

An aprotic solvent is selected from the group consisting of butylene carbonate, propylene carbonate, ethylene carbonate, dimethyl carbonate, diethyl carbonate, sulfolane, methyl sulfolane, dimethoxy ethane, γ-butyrolactone, and mixtures thereof.

The polymer is used after it is completely dissolved in tetrahydrofuran which is an organic solvent before the polymer is prepared.

A surface-treated powder of inorganic material such as silica, alumina, etc. can be added to the gel polymer electrolyte in order to improve the mechanical strength and alleviate the crystallized area.

It is preferable that the polymer material in a gel polymer electrolyte according to the present invention is in the range of 20 to 30% by weight, the inorganic material filler is in the range of 5 to 20% by weight, and the liquid electrolyte is in the range of 60 to 80% by weight.

As a specific functional group which has a high compatibility with a liquid electrolyte in the present invention is contained in the polymer material, a lithium ion becomes to move with ease in electrolyte, and the ionic conductivity is over 0.5 mS/cm which is the demand level of a gel polymer electrolyte. Also, it provides the gel polymer electrolyte material with a high film formability, a good wettability of containing an electrolyte, a good adhesion, and a good mechanical strength.

BRIEF DESCRIPTION OF THE DRAWINGS

The present invention will be described with reference to the accompanying drawings of which.

DETAILED DESCRIPTION OF THE INVENTION

Figure 1:
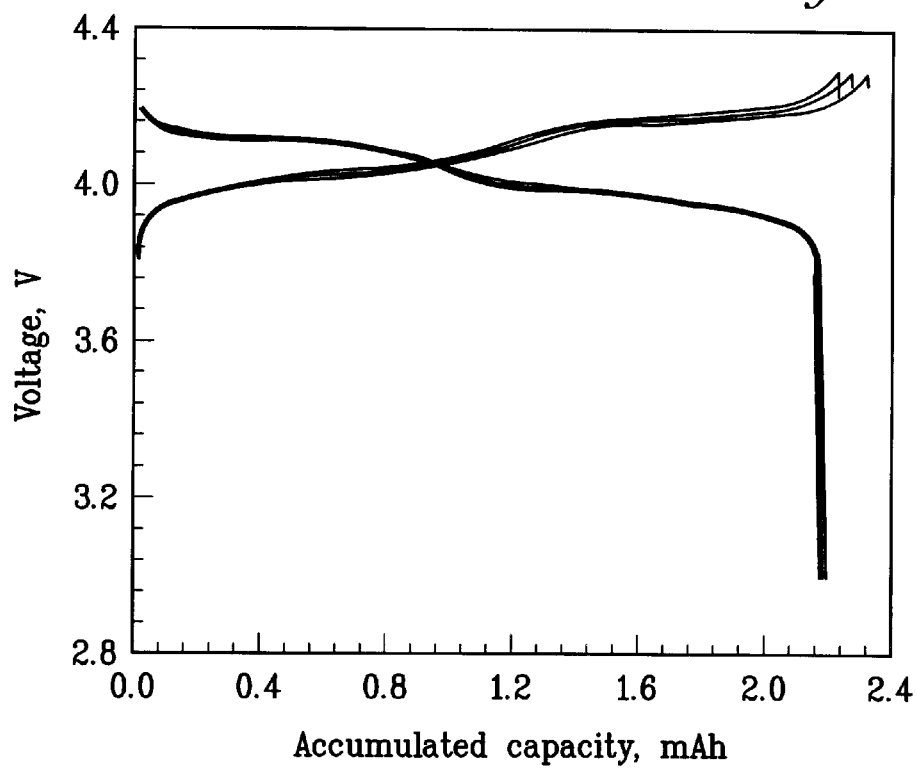
FIG. 1 is a charge/recharge profile that gel polymer electrolytes prepared using polymer matrix No. 1 are applied to a cell composed of lithium metal oxide composite cathode/gel polymer electrolyte/lithium metal in accordance with the Examples of the present invention.

The present invention relates to polymer materials in use of a gel polymer electrolyte which has a high film formability, and a good mechanical strength, and an excellent adhesion property with surface of positive and negative electrodes.

Because the adhesion between the surface of cathode and anode and encapsulating property of liquid electrolytes in the polymer matrix are related to content of a polar group and strength of polarity in molecular chain of polymer, in case of containing vinyl acetate repeating unit having a high polarity in the matrix materials, it is possible to solve the leaking problem of liquid electrolytes and improve the ionic conductivity of polymer, therefore, the polymer of the present invention is become to be developed.

The polymers developed in the present invention are poly(vinyl acetate) copolymers, poly(ethylene/vinyl acetate), poly(ethylene/vinyl acetate/carbon monoxide), and poly(ethylene/vinyl acetate/maleic acid anhydride).

The poly(vinyl acetate) copolymer is represented as the following formula (I):

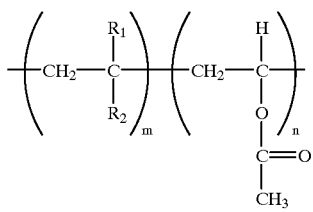

wherein $R_1$ is H or $CH_3$, $R_2$ is

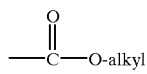

(alkyl is methyl, ethyl, propyl, isopropyl or butyl) or 1-pyrrolidone, m and n are mol % ratio with the range of 50–99:1–50.

The another polymer according to the present invention is selected from the group consisting of a copolymer(ethylene/vinyl acetate), poly(ethylene/vinyl acetate/carbon monoxide: EVACM), and poly(ethylene/vinyl acetate/maleic acid anhydride: EVAMA), which is represented as the following formula (II):

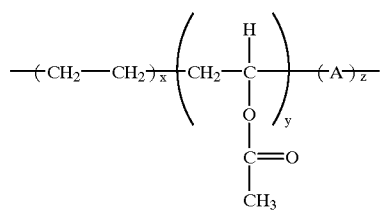

wherein A is carbonyl

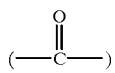

or maleic anhydride

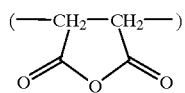

and x:y:z are weight % ratio with the range of 60–90:10–40:0–20.

The present invention provides a polymer made by introducing a vinyl acetate repeating unit to the polymer so as to have polarity strength which is suitable to containing a liquid organic electrolytes in molecule. That is, the gel polymer electrolyte according to the invention is a polymer electrolyte suitable to a lithium polymer secondary cell by nixing a liquid electrolyte containing lithium ion and an inorganic material such as surface-silanized silica with the copolymer or polymer illustrated in formula (I) and formula (II) in molecule.

The copolymer of vinyl acetate invented in this work is prepared by emulsion polymerization of each monomer. First, in a four-neck round bottomed flask setting up the mechanical stirrer, temperature controller, nitrogen supply line, and cooling tube, distilled water is added and nitrogen gas is supplied to fill the nitrogen in the flask. In the flask, sodium dodecylsulfonate as a emulsion agent, potassium persulfuric acid, acrylate, and vinyl acetate monomer are added. After the mixture is stirred sufficiently, the temperature in the flask is fitted to 60° C. After the polymerization reaction continues for 12 hours, the mixture is added to the aqueous solution of aluminum sulfuric acid. The mixture is filtered, washed several times with the distilled water of 80° C. to remove the emulsifier and aluminum sulfuric acid, and then washed with alcohol to remove the unreacted monomer. To purify the crude gel polymer, it is dissolved in acetone and distilled again. After the purified polymer is dried, the final poly(acrylate/vinyl acetate) is obtained. While, the polymers of family of vinyl acetate/vinyl pyrrolidone, ethylene/vinyl acetate, and terpolymer used in the present invention are available from Aldrich Co. in U.S.A..

The molecular weight of the polymer is in the range of 50,000 to 1,000,000, more preferably in the range of 100,000 to 800,000 and the most preferable molecular weight is in the range 200,000 to 500,000. In case that the molecular weight is in excess of 1,000,000, there is difficulty in the preparation of the polymer solution in use of a solid electrolyte because dissolution ability of the polymer to the solvent is diminished.

By introducing acrylate, pyrrolidone, carbon monoxide, maleic acid anhydride, or a mixture thereof as well as vinyl acetate group to the polymer to improve the interaction between the polymer and the solvent for electrolyte, the polymer can contain more electrolyte. Therefore, the ionic conductivity of a gel polymer electrolyte can be improved over 0.5 mS/cm by movement of metal ion such as lithium through the solvent contained in the polymer.

The polymer material of the present invention is applied to a gel polymer electrolyte in use of a lithium polymer secondary cell, especially complex polymer electrolyte prepared by mixing the polymer material, a liquid organic electrolyte which a metal salt is dissolved in an aprotic solvent, and inorganic filler. The complex polymer electrolyte shows a high film formability, a good property of containing an electrolyte, a good adhesion between surface of the cathode and anode, and a high ionic conductivity over 0.5 mS/cm.

The aprotic solvent used when the complex polymer electrolyte is prepared using the polymer material of the present invention is selected from the group consisting of butylene carbonate, propylene carbonate, ethylene carbonate, dimethyl carbonate, diethyl carbonate, sulfolane, methyl sulfolane, dimethoxy ethane, γ-butyrolactone, and mixtures thereof. A lithium salt dissolved in an aprotic solvent is selected from the group consisting of lithium perchlorate ($LiClO_4$), lithium tetrafluoroborate ($LiBF_4$), lithium hexafluorophosphate ($LiPF_6$), lithiumtrifluoromethanesulfonate ($LiCF_3SO_3$), lithium trifluoromethanesulfonamide ($LiN(CF_3SO_2)_2$), and a mixture thereof.

A surface silanized silica, alumina, etc. can be added to the gel polymer electrolyte in order to improve the mechanical strength and alleviate the high recharged area. By introducing the specific functional group in the side chains of the polymer to the polymer material to improve the interaction between the polymer and the solvent for electrolyte, the polymer of the present invention can contain more electrolyte. Therefore, the ionic conductivity of a gel polymer electrolyte can be improved over 0.5 mS/cm by movement of metal ion such as lithium through the solvent contained in the polymer. Also, a polymer electrolyte having a high film formability, a good property of containing an electrolyte, a good adhesion between surface of the cathode and anode, and a good mechanical strength can be obtained in the present invention.

The present invention may be better understood by reference to the following examples which are intended for purposes of illustration and are not to be confined as in any way limiting the scope of the present invention, which is defined in the claims appended hereto.

EXAMPLES 1–3

After 15 % by weight of copolymer(acrylate/vinyl acetate) and vinyl pyrrolidone/copolymer(vinyl acetate) of the formula (I) were respectively dissolved in tetrahydrofuran, gel polymer electrolytes were prepared by mixing with an inorganic material and an electrolyte. The ratio of composition was shown in Table 1. The ionic conductivity of copolymer was obtained using the following equation with resistance measured according to movement of lithium ion using IM6 which is an impedance measuring apparatus. The value of ionic conductivities were shown in Table 2.

$$\text{Conductivity} = \frac{\text{Thickness}(\mu m)}{\text{Resistance}(\Omega) \times \text{Area}(cm^3)} \; [S/cm]$$

The matrix polymer of Examples 1–2 are polymers that $R_1$ is H and $R_2$ is —COOCH$_3$ in the formula (I) and the matrix polymer of Example 3 is polymer that $R_1$ is H and $R_2$ is 1-pyrrolidone in the formula (I).

TABLE 1

| Example | Matrix Polymer Number | Vinyl Acetate mol % | Mol % of Second Component | |
|---|---|---|---|---|
| | | | ($R_2$ = COOCH$_3$) | ($R_2$ = 1-pyrrolidone) |
| 1 | 1 | 5.31 | 94.69 | — |
| 2 | 2 | 10.30 | 89.70 | — |
| 3 | 3 | 49.80 | — | 50.20 |

TABLE 2

| Example | Gel Electrolyte Number | Matrix Polymer Number | Matrix Polymer wt % | Silica wt % | 1M LiClO$_4$ in EC/PC(1:1) wt % | Conductivity [mS/cm] |
|---|---|---|---|---|---|---|
| 1 | 1 | 1 | 20 | 20 | 60 | 1.36 |
| 2 | 2 | 2 | 20 | 20 | 60 | 2.03 |
| 3 | 3 | 3 | 15 | 25 | 60 | 0.89 |

EXAMPLE 4

Gel electrolytes were prepared using the matrix polymer number of the Example 1 in the same method as described in Example 1 except for inorganic filling agent in gel electrolyte component. Transparent gel electrolytes in thickness of the range 80–120 μm were obtained by the method that gel electrolyte component slurry was casted with a casting knife in thickness of 800 μm on release paper and dried for 2 hours. After ionic conductivity was measured with an impedance measuring apparatus, the results was shown in Table 3. Also, the properties of conductivities of gel electrolytes were shown in Table 3.

TABLE 3

| Example | Gel Electrolyte Number | Matrix Polymer part | Silica part | 1M LiClO$_4$ in EC/PC(1:1) part | Thickness [μm] | Conductivity [mS/cm] |
|---|---|---|---|---|---|---|
| 4a | 4 | 4 | 1 | 12 | 110 | 3.43 |
| 4b | 5 | 4 | 2 | 12 | 92 | 2.38 |
| 4c | 6 | 4 | 3 | 12 | 105 | 1.80 |

EXAMPLE 5

Gel electrolytes were prepared using the matrix polymer number of the Example 1 in the same method as described in Examples 1 & 4 except for % weight of each composition in gel electrolyte components (referred to Table 4). The conductivity was obtained from measurement of impedance of the prepared gel electrolyte (referred to Table 5). When impedance was measured according to the change of temperature, the test was performed after gel electrolytes were set at least over 30 minutes.

TABLE 4

| Example | Gel Electrolyte Number | Matrix Polymer wt % | Silica wt % | 1M LiClO$_4$ in EC/PC(1:1) wt % |
|---|---|---|---|---|
| 5a | 7 | 15 | 10 | 75 |
| 5b | 8 | 21 | 14 | 65 |
| 5c | 9 | 27 | 18 | 55 |

TABLE 5

| Example | Gel Electrolyte Number | Conductivity [mS/cm] | | | |
|---|---|---|---|---|---|
| | | 5° C. | 25° C. | 45° C. | 65° C. |
| 5a | 7 | 0.90 | 1.89 | 2.42 | 3.24 |
| 5b | 8 | 0.83 | 1.14 | 1.58 | 1.89 |
| 5c | 9 | 0.33 | 0.72 | 0.98 | 1.16 |

The gel electrolytes had a good property of conductivity which could be used in a lithium polymer secondary cell because the ionic conductivities of all of the gel electrolytes were over 1 mS/cm in the Example 1–5. Also, in case of the gel electrolytes components used copolymer of methyl methacrylate/vinyl acetate as a polymer matrix, the gel electrolytes prepared in composition which the content of electrolyte was over 60% weight were shown the high property of conductivity over 1 mS/cm at room temperature.

EXAMPLES 6–9

Gel electrolytes were prepared using the composition consisted of matrix polymer number, inorganic filling agent, and electrolyte in the formula (II) (referred to Table 6). After the matrix polymer was completely dissolved in tetrahydrofuran of sealed container at 50° C. and surface-treated silica was added, it was vigorously mixed for 5 hours. To the mixture, electrolyte was added and the mixture was mixed 1 more hour, and then gel electrolyte composition slurry was prepared. After air bubble in the prepared slurry was completely removed in the condition of 50° C., the slurry was casted on the release paper in thickness of 800 μm and dried. The conductivity of the prepared gel electrolyte was measured in the same method of the Example 1 (referred to Table 7).

TABLE 6

| | Matrix Polymer | x | y | z, wt % | |
|---|---|---|---|---|---|
| Example | Number | wt % | wt % | Carbon monoxide | Maleic anhydride |
| 6 | 4 | 60.00 | 40.00 | — | — |
| 7 | 5 | 66.00 | 24.00 | 10.00 | — |
| 8 | 6 | 63.00 | 28.00 | 9.00 | — |
| 9 | 7 | 81.25 | 18.00 | — | 0.75 |

TABLE 7

| Example | Gel Electrolyte Number | Matrix Polymer Number | Matrix Polymer wt % | Silica wt % | 1M LiClO$_4$ in EC/PC(1:1) wt % | Conductivity [mS/cm] |
|---|---|---|---|---|---|---|
| 6a | 10 | 4 | 22.0 | 11.0 | 67.0 | 0.63 |
| 6b | 11 | 4 | 19.0 | 14.0 | 67.0 | 1.79 |
| 7 | 12 | 5 | 26.6 | 6.7 | 66.7 | 0.63 |
| 8 | 13 | 6 | 26.6 | 6.7 | 66.7 | 0.75 |
| 9 | 14 | 7 | 25.0 | 10.0 | 65.0 | 0.62 |

In case of the gel electrolytes 10–14, they showed the conductivity over 0.5 mS/cm, especially the ethylene unit partially contained in the structure of matrix polymer was locally phase-separated with electrolyte, and it is believed that the gel electrolytes play a role in extending the movement space of lithium ion in gel electrolyte.

Electrochemical Stability Test

The cell for measurement of electrochemical stability was prepared by the method that gel electrolyte was cut to 2 cm by 2 cm, sandwiched between stainless working electrode and lithium metal reference electrode, and then vacuum-sealed. The electrochemical stability was measured up to 3.0–5.5 V at a velocity of 5 mV/sec using the method of a linear sweep voltammetry. The results were shown in Table 8. Because the electrolytes were stable until the voltage was up to 4.8 V, the electrochemical stability was enough to be a gel polymer electrolyte in use of a lithium polymer secondary cell.

TABLE 8

| Example | Gel Electrolyte Number | Anodic Potential Limit of Stability (V vs. Li$^+$/Li) |
|---|---|---|
| 5a | 8 | 4.85 |
| 6b | 11 | 4.97 |

EXAMPLE 10

The unit cell was composed of a lithium metal oxide complex electrode/polymer gel electrolyte/lithium metal with polymer gel electrolytes prepared by using the matrix polymer No. 1 showing high conductivity of over 1 mS/cm regardless of gel electrolytes composition in Example 1–4. LiMn$_2$O$_4$ from FMC in U.S.A. and lithium metal from Cyprus Co. in U.S.A. were used as electrode materials. The composition of the complex of positive electrode of a lithium metal oxide was shown in Table 9.

TABLE 9

| Cathode Component | Composition (weight-percent) |
|---|---|
| LiMn$_2$O$_4$ | 43.6 |
| Carbon | 6.8 |
| Polymer Electrolyte (12.1 w/o matrix polymer No. 1 87.9 w/o 1M LiClO$_4$ in EC/DMC(1:1 by vol %)) | 49.6 |

*Five times of tetrahydrofuran to solid component was used as a solvent.

The positive electrode was prepared in dry box by the method that a lithium metal oxide, carbon and 3 ⌀ zirconia ball were added to the solution which polymer gel electrolyte was dissolved in tetrahydrofaran, and slurry prepared by ball-milling was casted on aluminium foil in thickness of 500 μm, and then dried for 2 hours.

The unit cell consisted of lithium metal oxide complex positive electrode/polymer gel electrode/lithium metal was prepared. The charge/discharge apparatus of TOYO Co. in Japan was used for the measurement of the rechargeable property of the cell. The charge/discharge of the prepared unit cell in FIG. 1 was performed with the positive current in the range of 3–4.3 V and 0.075 mAh/cm$^2$ of the current density. The calculated capacity of the cell was 128 mAh/g under the standard of weight of active materials.

Also, after the negative electrode was prepared by using carbon, the charge/discharge property was evaluated. The composition of the used negative electrode was shown in Table 10. The polymer gel electrolytes were prepared by using the electrolyte which was prepared to 18.37/10.20/71.43 weight % as the ratio of the composition of electrolyte matrix polymer No. 1/silica/1M LiClO$_4$ in EC/GBL(1:1 by vol %) using matrix polymer No. 1. MCMB 2528 of Osaka Gas Co. in Japan was used for carbon in use of the negative electrode. The preparation method of the positive and negative electrode and the cell are the same as the above.

TABLE 10

| Electrode | MCMB2528 wt % | LiMn$_2$O$_4$ wt % | Super-P wt % | Matrix Polymer No.1 wt % | 1M LiClO$_4$ in EC/GBL(1:1) wt % |
|---|---|---|---|---|---|
| Cathode | — | 48.2 | 7.6 | 6.4 | 37.8 |
| Anode | 40.4 | — | 7.7 | 7.7 | 44.2 |

*Five times of tetrahydrofuran to solid component was used as a solvent.

Figure 2:
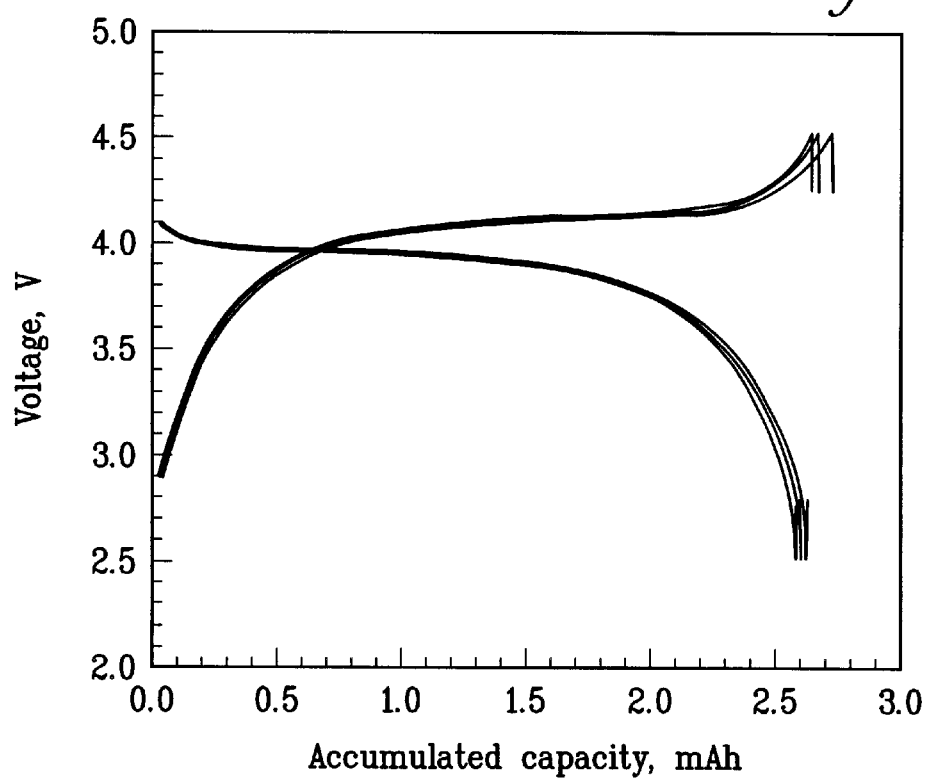
FIG. 2 is a charge/recharge profile that gel polymer electrolytes prepared using polymer matrix No. 1 are applied to a cell composed of lithium metal oxide composite cathode/gel polymer electrolyte/carbon composite anode in accordance with the Examples of the present invention.

The change of the capacity property according to the number of recharging in the condition of the prepared 5 hours rechargeable ratio, especially the recharging profile in the range of the number of 55–60 was shown in FIG. 2. In the result of recharging up to the number of 55–60, the cell showed a good charge/discharge property and the decrease depending on the cycle of the cell capacity of 2.6 mAh was not so large.

Having described this invention, however, many modifications thereto will become apparent to those skilled in the art to which it pertains without deviation from the spirit of the invention as defined by the scope of the appended claims.

What is claimed is:

1. A copolymer for use as a component of a gel polymer electrolyte of a lithium cell, the copolymer having the formula:

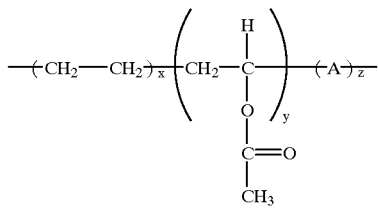

wherein A is

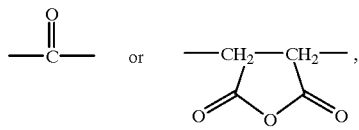

and x:y:z are weight % ratio with the range of 60–90:10–40:0–20.

2. The copolymer of claim 1 wherein said copolymer has a weight average molecular weight of the range of 50,000–1,000,000.

3. The copolymer of claim 2 wherein said copolymer has a weight average molecular weight of the range of 100,000–800,000.

4. The copolymer of claim 3 wherein said copolymer has a weight average molecular weight of the range of 200,000–500,000.

5. A gel polymer electrolyte composition for use in a lithium cell, which comprises:

20–30% by weight of a copolymer having the formula;

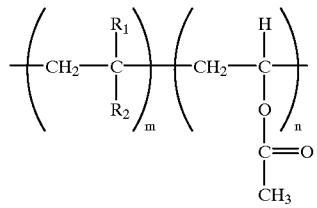

wherein $R_1$ is H or $CH_3$; $R_2$ is 1-pyrrolidone or

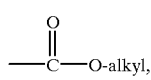

where alkyl is methyl, ethyl, propyl, isopropyl or butyl; m and n are mol % ratio with the range of 50–99:1–50, 5–20% by weight of an inorganic filler; and 60–80% by weight of an electrolyte solution comprising a lithium salt dissolved in an aprotic solvent.

6. The gel polymer electrolyte composition of claim 5 wherein said inorganic filler is silica or alumina.

7. The gel polymer electrolyte composition of claim 5 wherein said lithium salt is selected from the group consisting of lithium perchlorate, lithium tetrafluoroborate, lithium hexafluorophosphate, lithiumtrifluoromethanesulfonate, lithium trifluoromethanesulfonamide, and mixtures thereof.

8. The gel polymer electrolyte composition of claim 5 wherein said aprotic solvent is selected from the group consisting of butylene carbonate, propylene carbonate, ethylene carbonate, dimethyl carbonate, diethyl carbonate, sulfolane, methyl sulfolane, dimethyl ethane, γ-butyrolactone, and mixtures thereof.

9. A gel polymer electrolyte composition for use in a lithium cell, which comprises:

20–30% by weight of a copolymer according to claim 1;

5–20% by weight of an inorganic filler; and

60–80% by weight of an electrolyte solution comprising a lithium salt dissolved in an aprotic solvent.

10. The gel polymer electrolyte composition of claim 9 wherein said inorganic filler is silica or alumina.

11. The gel polymer electrolyte composition of claim 9 wherein said lithium salt is selected from the group consisting of lithium perchlorate, lithium tetrafluoroborate, lithium hexafluorophosphate, lithiumtrifluoromethanesulfonate, lithium trifluoromethanesulfonamide, and mixtures thereof.

12. The gel polymer electrolyte composition of claim 9 wherein said aprotic solvent is selected from the group consisting of butylene carbonate, propylene carbonate, ethylene carbonate, dimethyl carbonate, diethyl carbonate, sulfolane, methyl sulfolane, dimethyl ethane, γ-butyrolactone, and mixtures thereof.

13. In a lithium cell of the kind having a gel polymer electrolyte, the improvement wherein the gel polymer electrolyte includes a vinyl acetate copolymer of the formula:

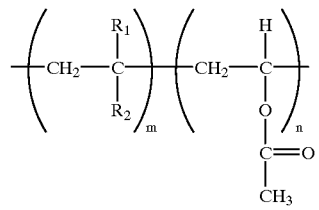

wherein $R_1$ is H or $CH_3$; $R_2$ is 1-pyrrolidone or

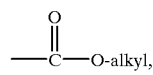

where alkyl is methyl, ethyl, propyl, isopropyl or butyl; m and n are mol % ratio with the range of 50–99:1–50; and the copolymer has a weight average molecular weight of 200,000–500,000.

14. In a lithium cell of the kind having a gel polymer electrolyte, the improvement wherein the gel polymer electrolyte includes a vinyl acetate copolymer of the formula:

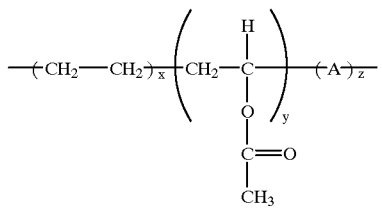

wherein A is

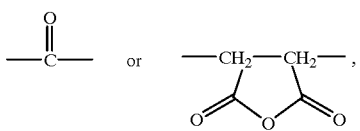

x:y:z are weight % ratio with the range of 60–90:10–40:0–20, and the copolymer has a weight average molecular weight of 200,000–500,000.

15. In a lithium cell of the kind having an electrolyte composition containing a gel polymer, the improvement wherein the composition comprises:

a) 5–20% by weight of an inorganic filler;
b) 60–80% by weight of an electrolyte solution comprising a lithium salt dissolved in an aprotic solvent; and
c) 20–30% by weight of a vinyl acetate copolymer of the formula:

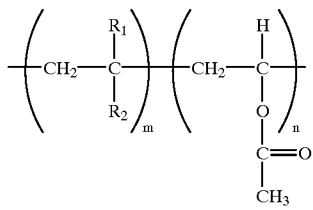

wherein $R_1$ is H or $CH_3$; $R_2$ is 1-pyrrolidone or

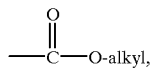

where alkyl is methyl, ethyl, propyl, isopropyl or butyl; and m and n are mol % ratio with the range of 50–99:1–50.

16. The lithium cell of claim 15 wherein said inorganic filler is silica or alumina.

17. The lithium cell of claim 15 wherein said lithium salt is selected from the group consisting of lithium perchlorate, lithium tetrafluoroborate, lithium hexafluorophosphate, lithium trifluoromethanesulfonate, lithium trifluoromethanesulfonamide, and mixtures thereof.

18. The lithium cell of claim 15 wherein said aprotic solvent is selected from the group consisting of butylene carbonate, propylene carbonate, ethylene carbonate, dimethyl carbonate, diethyl carbonate, sulfolane, methyl sulfolane, dimethyl ethane, γ-butyrolactone, and mixtures thereof.

19. In a lithium cell of the kind having an electrolyte composition containing a gel polymer, the improvement wherein the composition comprises:

a) 5–20% by weight of an inorganic filler;
b) 60–80% by weight of an electrolyte solution comprising a lithium salt dissolved in an aprotic solvent; and
c) 20–30% by weight of a vinyl acetate copolymer of the formula:

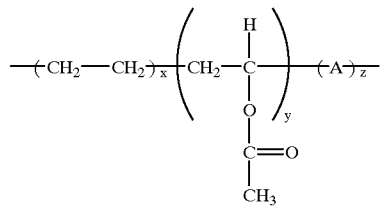

wherein A is

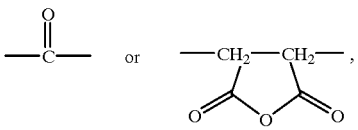

and x:y:z are weight % ratio with the range of 60–90:10–40:0–20.

20. The lithium cell of claim 19 wherein said inorganic filler is silica or alumina.

21. The lithium cell of claim 19 wherein said lithium salt is selected from the group consisting of lithium perchlorate, lithium tetrafluoroborate, lithium hexafluorophosphate, lithium trifluoromethanesulfonate, lithium trifluoromethanesulfonamide, and mixtures thereof.

22. The lithium cell of claim 19 wherein said aprotic solvent is selected from the group consisting of butylene carbonate, propylene carbonate, ethylene carbonate, dimethyl carbonate, diethyl carbonate, sulfolane, methyl sulfolane, dimethyl ethane, γ-butyrolactone, and mixtures thereof.

* * * * *